Oct. 16, 1934.  H. R. SEGAL  1,977,292
MILK DISPENSING DEVICE
Filed Oct. 5, 1933  4 Sheets-Sheet 1

Oct. 16, 1934.    H. R. SEGAL    1,977,292
MILK DISPENSING DEVICE
Filed Oct. 5, 1933    4 Sheets-Sheet 2
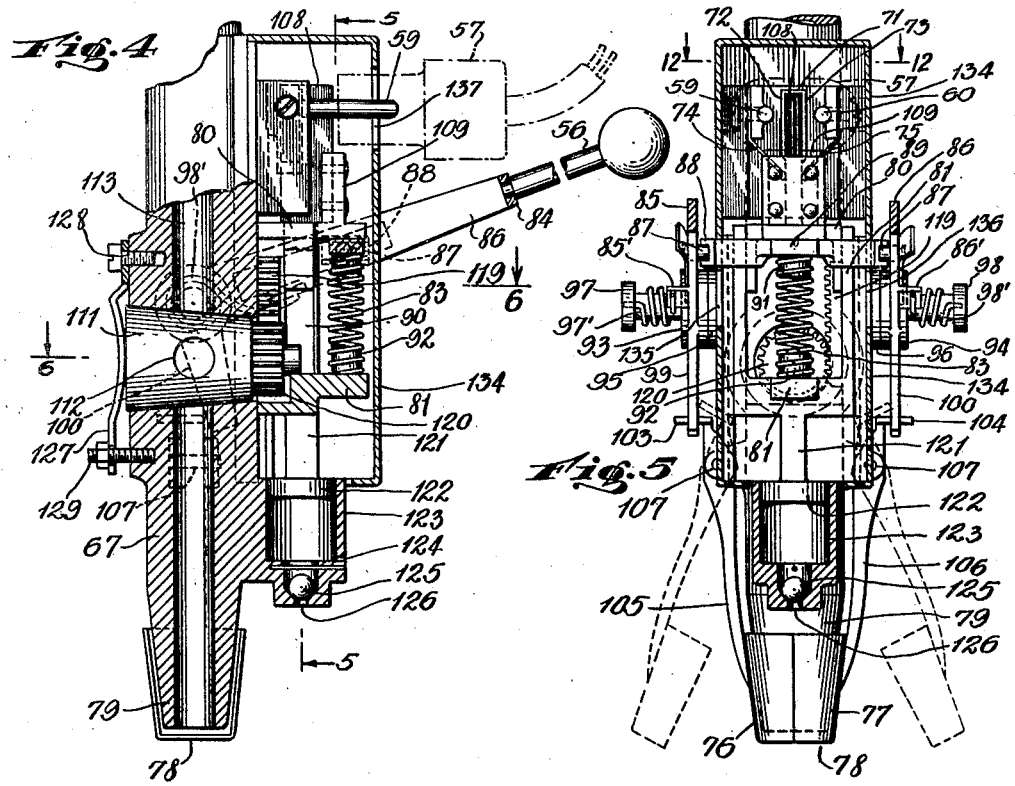
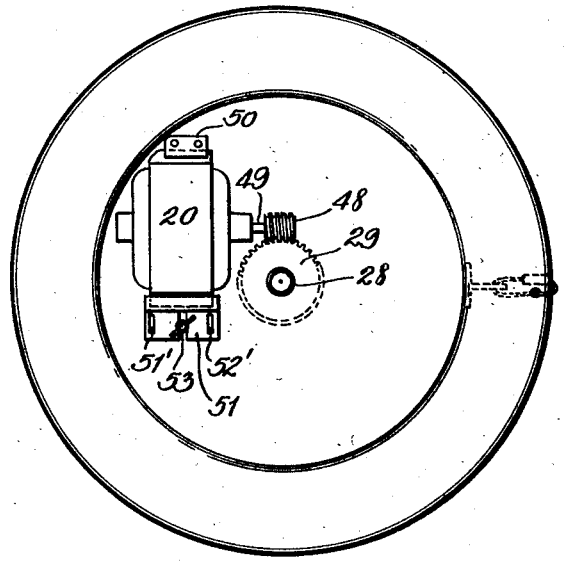
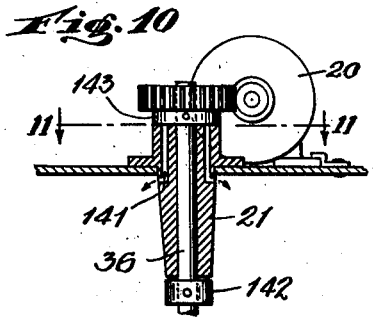
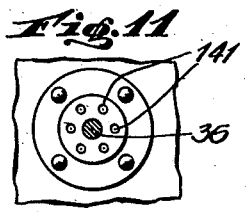
INVENTOR
H. R. Segal
BY
ATTORNEY

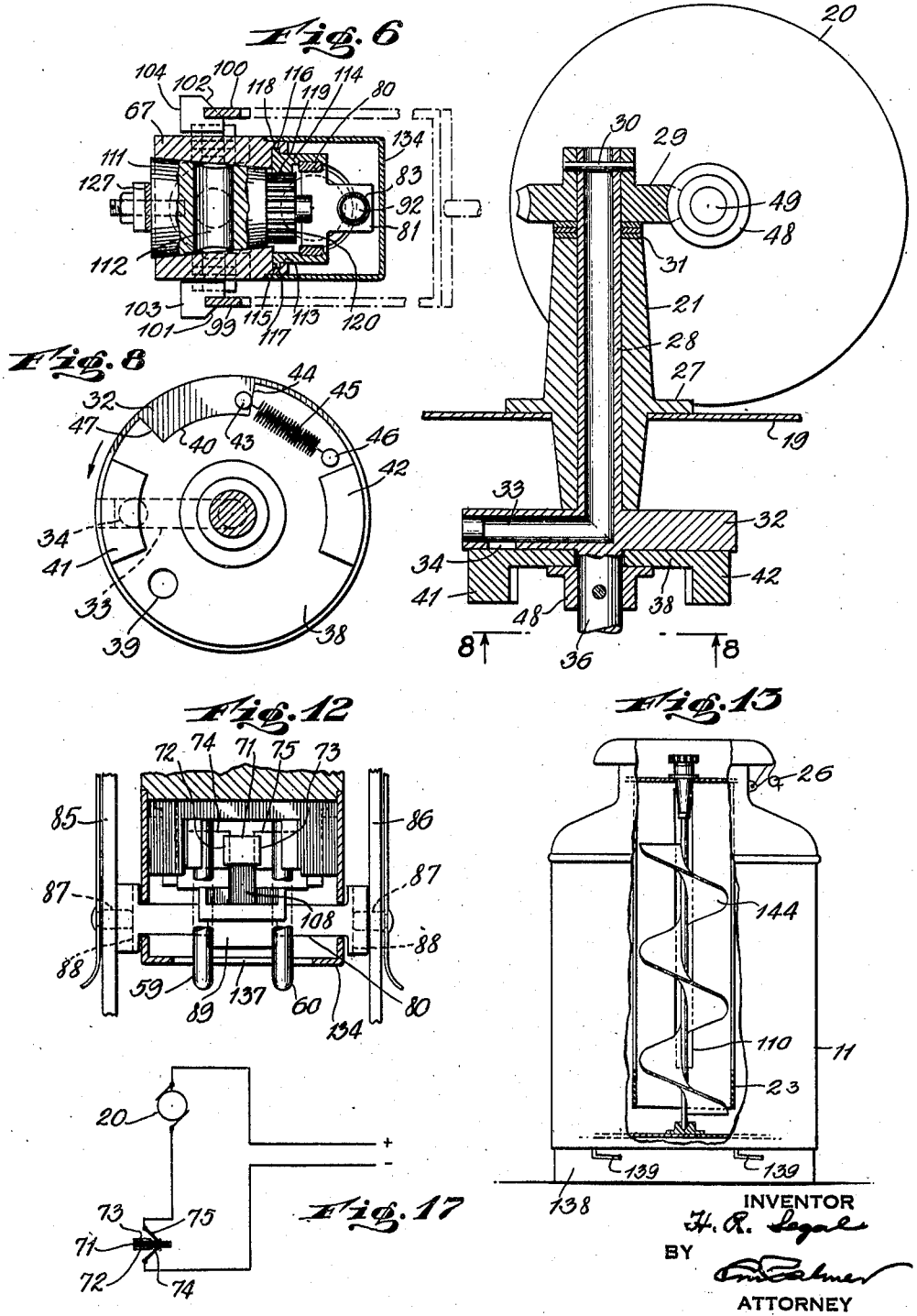

Oct. 16, 1934.  H. R. SEGAL  1,977,292
MILK DISPENSING DEVICE
Filed Oct. 5, 1933  4 Sheets-Sheet 4
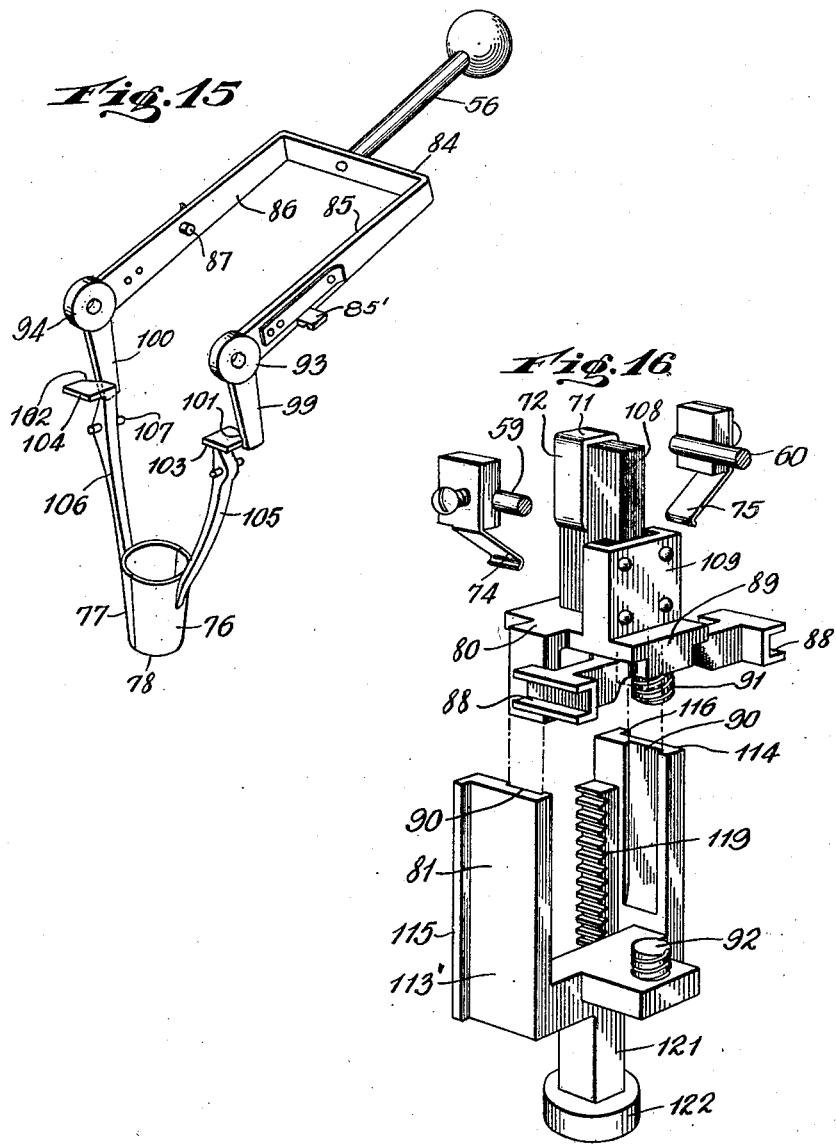

Patented Oct. 16, 1934

1,977,292

UNITED STATES PATENT OFFICE 1,977,292

MILK DISPENSING DEVICE

Hyman R. Segal, New York, N. Y.

Application October 5, 1933, Serial No. 692,311

19 Claims. (Cl. 221—67)

The present invention is concerned with dispensing and more particularly is directed to an improved can which is adapted to be filled with a relatively large supply of milk at a dairy and from which the milk is dispensed at points of distribution at vendor's retail establishment in a sanitary condition.

The invention has as one of its objects the provision of a sanitary milk dispensing device having interior milk contacting surfaces which may be readily cleaned and sterilized.

The invention has for a further object the provision of a milk dispensing device adapted to be filled and appropriately sealed at the pasteurization plant at a relatively low cost.

The invention has for a further object the provision of a sealed device adapted to dispense a steady and properly mixed supply of milk, the device being so constructed to preclude the introduction of any injurious particles or bacteria into it without breaking the seal.

The invention has for a further object the provision of automatic means for thoroughly commingling the cream and milk preparatory to each dispensing operation at the retail vendor's establishment.

The invention has for a further object the provision of a milk dispensing device having milk contacting parts which may be easily disassembled for cleaning, the device being so constructed as to have its milk contacting surfaces protected against contamination from manual contact or subjected to files, injurious bacteria or dust.

The invention comprehends as a further object the provision of a sanitary milk dispensing device having a unitary manipulator actuated on the part of the operator for rendering effective the valve and valve control parts of said device automatically and in a predetermined sequence.

The invention further contemplates as an object to provide a sealed and sanitary milk dispensing device hav'ng a governor operable in response to the acceleration of agitator means to permit a required amount of air to act on the surface of the milk within the device to insure proper siphoning therefrom.

The invention further comprehends as an object to provide a sanitary milk dispensing device having a swingable spout on which is mounted suitable control mechanism for setting in operation a motor for operating an agitator, said mechanism including parts to delay the dispensing operation until the milk has been thoroughly stirred and subjected to atmospheric pressure.

Other objects, advantages and features of the invention are in part obvious and in part pointed out hereinafter.

The invention will be best understood and appreciated from the following description of several preferred embodiments thereof selected for purposes of illustration and shown in the accompanying drawings in which:

Fig. 1 is a sectional view of the milk dispensing device according to the invention.

Fig. 2 is a section on the line 2—2 of Fig. 1.

Fig. 3 is a vertical elevational view of the milk dispensing device of Fig. 1, partly broken away to show the interior construction and with the spout thereof shown locked in an inoperative position.

Fig. 4 is a sectional elevational view of the control mechanism for operating the valve.

Fig. 5 is a vertical section taken on the line 5—5 of Fig. 4.

Fig. 6 is a section taken on the line 6—6 of Fig. 4.

Fig. 7 is an enlarged vertical section of the governor and the associated hollow shaft and bearing.

Fig. 8 is a view of the governor along the line. 8—8 of Fig. 7 looking in the direction of the arrows.

Fig. 9 is a plan view of the milk dispensing device on a larger scale.

Fig. 10 is a vertical section of a modified form of governor for regulating the air pressure within the dispensing device.

Fig. 11 is a section along the line 11—11 of Fig. 10.

Fig. 12 is a section taken along the line 12— 12 of Fig. 5.

Fig. 13 is a vertical elevational view of a milk dispensing device according to the invention, party broken away to show a conveyor type of agitator which may be employed.

Fig. 14 is a section of a connector in the form of a hollow and split joint taken on the line 14—14 of Fig. 1.

Fig. 15 is a view in perspective of the actuator for operating the control mechanism and the complementary split sections of a cup which protects the mouth or nozzle of the spout and Fig. 16 shows an exploded view in perspective of the control mechanism.

Fig. 17 is a diagrammatic view of the operating circuit for the motor.

According to the invention, the milk dispensing device, herein illustrated is in the form of a can generally designated 10 and is filled with milk at the place of pasteurization, as at a dairy. The can has a cylindrical body 11 which is provided with an upwardly and inwardly sloping neck 12 from which projects an annular rim or head 13 provided with a beaded edge 14.

Attached to the lower part of the body of the can is a base plate or flooring 15 which includes a depending annular flange 16 appropriately riveted or otherwise fastened to the body 11.

A dish shaped closure 17 has its intermediate annular part 18 frictionally and removably secured to the annular rim 13 of the can. The bottom wall 19 of closure 17 is utilized to removably support an electric motor 20 and to sustain the bearing or bushing 21.

Extending downwardly and outwardly from the upper portion of the annular part 18 is an annular overhanging concavo-convex hood 22 which in cooperation with the beaded edge 13 limits the downward insertion of the closure 17 within the confines of the annular rim 13.

Appropriately fastened to the lower face of the bottom wall 19 is a slotted shell or skirt 23. This shell 23 is bodily movable with the dished closure 17, such that if the latter is removed from the interior of the can the slotted shell is carried along as well.

After the can has been filled at the place of pasteurization, the dished closure is sealed to the body of the can by means of a wire 24 which is threaded through a perforation in hood 22 and a perforated lug 25 projecting from the can, the free ends of the wire being appropriately soldered or otherwise fastened together as at 26, that is to say, unless the wire 24 is cut, the dished closure cannot be manually removed from the can.

The bearing or bushing 21 has its lower portion passing through a suitable opening in the bottom wall 19, the upper horizontal surface of which supports the intermediately disposed flange 27 of the bushing. A hollow shaft 28 is appropriately journalled within the bushing 21 and the driven worm gear 29 is fastened to the shaft by the transverse pin 30, the gear 29 being suitably spaced from the upper part of the bushing by several washers as 31.

Integral with the hollow shaft 28 is a disc shaped member 32 which embodies a horizontal channel 33 registering with the axial bore of the hollow shaft 28 and channel 33 communicates with an opening 34 in the bottom of the disc 32.

Bodily movable with the disc 32 and appropriately supported in a grooved boss or bearing 35 is a solid shaft 36 and the latter is always in synchronism with the movement of the hollow shaft 28. Shaft 36 carries at its lower end a propeller 37 for agitating the supply of milk within the can.

For regulating the air pressure within the can after the agitation has reached a predetermined speed, a weighted governor 38 is provided. The governor is loosely mounted on the solid shaft 36 but held against the underface of the disc 32 to prevent air leakage between their contacting surfaces until a predetermined speed is reached, at which time opening 34 registers with opening 39 of the floating governor 38. When this occurs, air from the outside of the can will enter the hollow shaft and pass downwardly therethrough and into the channel 33 and opening 34 and finally through opening 39 into the interior of the can to subject the head of milk therein under atmospheric pressure.

The floating governor 38 is in the form of a disc having a marginal and segmental portion as 40 cut away. Diametrically opposed and weighted segments 41 and 42 depending from the governor disc 38 aid to maintain vent openings 34 and 39 in registration so long as the predetermined speed of the agitator continues.

The upper disc 32 carries a post 43. With the agitator at rest, post 43 is against the edge 44 of the cut away portion 40 and is held in this position by the relatively light weight helical spring 45 which has one terminal attached to post 43 and its other terminal attached to a post 46 carried by the floating governor disc 32. As disc 32 gains in momentum, post 43 moves towards edge 47 of the cut away portion 40 against the energy of the spring 45. During the acceleration of disc 32 or regulator shaft 36, the post 43 abuts edge 47 and consequently drives the governor disc 38 as to rotate in synchronism with the disc 32. The floating governor 38 is operatively held against the underface of disc 32 by reason of the flanged collar 48 fixedly carried by the solid shaft 36.

Motion is imparted to the gear or pinion 29 and consequently to the hollow shaft 28 by the worm 48 attached to the rotatable shaft 49 of the motor 20. The motor 20 is removably held between the fixed bracket 50 and the shiftable bracket 51, the latter being slidably guided on the spaced fixed pins 51' and 52' carried by the dished closure and adjustably held thereon by the adjustable winged nut 53.

Electrically associated with the field of the motor is a split cable 54 which has at one end a plug 55 adapted to be connected to a suitable supply of electrical energy. According to the invention, although plug 55 may be connected to a suitable source of energy, its operating circuit is still open and hence the motor cannot operate until a handle or manipulator 56 has been depressed and provided further socket 57 carried by branch 58 of the split cable 54 has been mounted on the stationary terminal conductors or posts 59 and 60.

With the handle 56 in a raised position, although plug 55 is operatively connected to its socket, and socket 57 is mounted on its terminals 59 and 60, the electric circuit for motor 20 is still broken. If the motor is therefore inoperative at this time, the head of the milk within the can is without atmospheric pressure and hence siphoning of the milk through the inverted U-shaped tube 61 does not take place. Tube 61 has one leg 62' passing through a suitable opening 66 in the bottom wall 15 of the can and operatively communicates with complementary parts 62 and 63 of a connector forming a hollow joint generally designated 64 carried by a closure plate 65 connected across opening 66 in which leg 62' extends. The free leg 67' of the siphon 61 is spaced from the bottom wall 15 of the can. When the can is filled with milk the siphon tube is completely filled up and at predetermined speed of the agitator 37, vents 34 and 39 register permitting atmospheric pressure to act on the top surface of the milk, which action, if the spout 67 has been set for dispensing, as shown in Fig. 1, will set up a continuous and steady flow of milk throughout the siphon tube and into the hollow joint 64 and into spout 67, as is well understood.

Complementary part 63 of the joint 64 is movable relative to the stationary complementary part 62 and the complements are appropriately held together against leakage by the shank of bolt 68 which is nonrotatably mounted in the movable complement 63 and suitably adjusted thereagainst by the nut 69. Complement 63 is rotatably guided on the stationary complement 62 by the annular rib or flange 69 operatively positioned within the annular rabbeted portion 70 of complement 62.

If it is now desired to complete the circuit for the motor, the handle 56 is depressed. A downwardly directed pull on the part of the operator will completely depress the handle. With the handle completely depressed several operations take place, to wit:—one, the inverted U shaped metal adapter or yoke 71, that is, legs 72 and 73 of yoke 71 engage respectively the stationary metal contacts 74 and 75; secondly complementary parts 76 and 77 of the split nozzle protector or cap, broadly denoted 78, move away from nozzle 79 of the spout 67 and thirdly the inner slidable frame 80 moves downwardly relative to outer frame 81 and causes the helicoidal spring 83 to compress.

The handle 56 is connected to a yoke member 84, the arms 85 and 86 of which each carry a pin as 87, which are slidably guided or rocked in a respective track as 88 of a cross head 89 carried by the slidable inner frame 80, the sides of the latter being guided in the vertical channels 90 of the upstanding sides of the frame 81 and the spring 83 has one end connected to the externally threaded post 91 depending from the cross head 89 and threadably connected to an upstanding post 92 carried by the outer frame 81.

Arms 85 and 86 terminate in perforated enlargements or ears 94 and 93 which are pivotally connected to the stationary hubs or bosses 95 and 96 carried by the body of the spout 67 on the adjustable headed pins or studs 97 and 98 respectively, the enlargements 93 and 94 carrying a depending lever 99 and 100 respectively for acting against the obliquely disposed rectilinear faces 101 and 102 of cam plates 103 and 104 of the pivoted jaws 105 and 106 for causing the upper ends of the jaws to move inwardly and the lower ends of the jaws to move outwardly and consequently bodily carry the complements 76 and 77 of the protector cup 78 outwardly and away from each other, the complements 76 and 77 being bodily attached to the lower portions of their respective jaws, each of which is provided with a pin as 107 pivotally carried by the body of the spout 67.

A block of insulation 108 is mounted within the bracket 109 of the frame 80 and is bodily movable with the latter. The yoke conductor 71 has its legs 72 and 73 straddling the sides of the insulation block 108 and is fixedly secured thereto. It follows therefore, if the yoke 84 is depressed, the cross head 89 is moved downwardly. Hence the frame 80 is lowered and if lowered, carries with it the yoke 71 and consequently, the circuit for operating the motor is established since the legs 72 and 73 engage the electrical contacts 74 and 75, see for example, the schematic showing of Fig. 17, in which it will be readily obvious that if contacts 74 and 75 are "made" the operating circuit for the motor 20 is established.

With the motor operating, the agitator 37 stirs the milk within the can. Circulation of the milk within the can is enhanced by the utilization of the slotted annular shell 23 since the milk flows downwardly within the shell and upwardly outside of the shell and ultimately passes between the slots 110 thereof and again downwardly within the shell, the milk being agitated and circulated even before a predetermined speed is attained by the motor and preparatory to the admission of air pressure from the outside.

If therefore, vents 34 and 39 register in response to the acceleration of said agitator means, these vents continue in registration during the operation of the motor and accordingly air is admitted to the interior of the can for properly siphoning the milk through the inverted U shaped tube 61 and hollow joint 64 from which it passes into the swingable spout 67.

Although the complements 76 and 77 of the split nozzle closing cup 68 have shifted outwardly and the speed of the motor has operated the governor to admit sufficient air pressure within the can to operate the siphon, still no milk will flow from the nozzle of spout since the frusto-conical rotatable valve 111 thereof has as yet not been actuated, that is to say, opening 112 of the valve is as yet not in registration with bore 113 of the spout.

With the handle held depressed, the spring 83 is collapsed by reason of the downward displacement of the inner frame 80 in respect to the outer frame 81 and hence if the handle is continued to be held depressed, the inner frame 80 cannot move upwardly. Consequently the outer frame 81 is moved downwardly by reason of the fact that spring 83 now tends to expand, the outer slidable frame 81 having sides 113' and 114 provided with flanges 115 and 116 which are guided in tracks 117 and 118 extending from the body of the spout 67.

In moving downwardly the outer slidable frame 81 bodily carries with it the vertical rack 119. The rack meshes with a geared pinion 120 appropriately mounted at one end of the valve. Hence, the valve is rotated as to cause its opening 112 to line up with the bore 113 of the spout. However, the registration of the opening 112 of the valve with the bore of the spout is delayed or retarded until such time as to insure the earlier operations above alluded to, namely the separation of complements 76 and 77 of the split cup; establishing the motor circuit to agitate the milk, opening of the vents by the governor, and lastly to compress the spring 83 so that it may subsequently expand to move the outer frame downwardly. Downward movement of the outer frame 81 together with its rack is retarded to delay the opening of the valve and this is accomplished by providing the outer frame 81 with a plunger 121 having piston 122 reciprocably mounted in cylinder 123 formed in the body of the spout. Movement of the piston downwardly is resisted by the air within the cylinder, the air being slowly ejected by the displacement of the piston through a relatively small pin opening or orifice 124, that is, the piston is moved downwardly when the spring pressure due to the expansion of spring 83 slowly overcomes the back pressure caused by the air within the cylinder. It is therefore apparent that if the handle is held down, the rack will ultimately operate the valve so that its opening 112 will register with the bore of the spout and accordingly permit a steady stream of appropriately mixed milk to travel through the spout and from its nozzle into a suitable container held below the nozzle.

Pursuant to dispensing of the required amount of milk, the handle is released by the operator and will move to its normally raised position automatically by reason of the torsion of springs 97' and 98' which are coiled about the shank of a respective headed stud as 97, each spring having one end firmly attached to the head of its stud and its other free end is disposed in a groove in the underface of an associated laterally extending lug as 85' or 86' projecting from the arms of the yoke 84 or manipulator.

If the yoke 84 be depressed, lugs 85' and 86' act against the free ends of the torsion spring 97' and 98' respectively thus causing these springs to wind up about their headed studs. If the handle 65 be released, springs 97' and 98' release and urge lugs 85' and 86' upwardly which action raises the inner frame 81 and consequently the spring 83 is raised upwardly.

The spring 83 is threadably connected to post 92 and in moving upwardly it will carry the outer frame 81 upwardly. Accordingly the valve 111 will be rotated such that opening 112 thereof will move to a position out of alignment in regard to the bore of the spout. Consequently dispensing of milk from the spout is no longer possible, the valve closing in a comparatively short time interval since the piston 122 is also raised permitting the ball check valve to open quickly and admit a relatively large supply of air within the cylinder through the bore 125.

In the upward movement of the inner frame, the circuit closing and breaking member or conducting yoke 71 moves away from the contacts 74 and 75 which are electrically associated with the stationary terminals 59 and 60. It follows therefore that the motor circuit is disabled and the motor stops. The agitator and governor are thus rendered ineffective. Complements 77 and 76 of the cup 78 also come together to enclose the nozzle of the spout to prevent dust, flies, bacteria, etc. to enter as is well understood. Of course, it is within the province of the invention, if desired to raise the handle 56 manually and thus restore the control mechanism to normal, that is, to a position of the parts such that no dispensing is possible. In such case the lugs 85' and 86' and associated torsion spring 97' need not be utilized.

If desired, the valve 111 may be quickly removed from the body of the spout for washing and cleaning. To this end, a swingable closure plate 127 is provided and has its ends removably connected to the body of the spout by the adjustable set screws 128 and 129, the intermediate part of closure plate 127 is dished out or depressed so that its convex surface may abut the end wall of the valve and hold the same in proper operative position. The closure plate 127 may be moved away from the valve by first unscrewing stud screw 129 from the body of the spout and subsequently swinging it about the upper set screw 128 after which access may be had to the valve.

The annular rim 130 attached to the bottom of the can provides a housing for the spout and the hollow joint 64 therefor. The spout may be swung to a position within the housing as illustrated in Fig. 3 or to a position preparatory to dispensing as shown in Fig. 1. In either case, the spout is held locked by reason of the spring bent clips 131 and 132. If the spout is within the housing the split cap or cup 78 is removably held by the clip 131. If the spout is in a position to dispense the tooth or cam 133 bodily carried by the swingable complement 63 of the hollow joint 64 is removably locked by the spring clip 132.

A casing 134 removably carried by the body of spout is utilized to enclose certain parts of the control mechanism and is provided with the spaced slots 135 and 136 to permit the displacement of the cross head 89 and with an opening 137 to permit the placement of the plug 57 on the spaced stationary conductors or terminals 59 and 60.

Where it is desired to close the housing 130 a suitable cap 138 is provided. This cap includes one or more L shaped slots as 139 and each of these cooperate with a post 140 projecting from the rim 130 to permit locking of the cap on the rim. As shown, slots 139 and their cooperating pins form the well known type of a bayonet connection but obviously other types of locking means may be utilized within the province of the invention.

When the can or enclosure has been filled at the dairy, the cover 17 is secured to the top of the can and sealed. At the vendor's retail establishment, the motor 20 is placed on the cover 17 and properly secured in position between the brackets 50 and 51 in such manner that its worm 48 meshes with the worm gear 29. After the can has been emptied, the motor 20 is removed, and secured to a similar but filled can, it being understood that the cans according to the invention will have a standard construction and that a standard motor may be utilized to actuate the agitator.

In the form according to Fig. 10, a slightly modified arrangement is disclosed for the process of admitting air within the can after the motor has been operated. In this arrangement, the bearing or bushing 21 for the agitator shaft 36 is provided with a plurality of channels as 141. When the motor 20 is set into operation an upward thrust is exerted on shaft 36 which thrust will raise the same causing collar 142 to rise and float against the lower part of the bushing at the same time the closure collar 143 will also be raised and move away from the upper part of the bushing, providing an air gap to permit air to enter into the several vent channels 141 and into the interior of the can to facilitate siphoning and dispensing and so long as the predetermined speed of the motor persists this venting will take place.

According to the form illustrated in Fig. 13, a conveyor type of agitator is disclosed. This form of conveyor, if rotated, causes the liquid within the slotted shell to be pulled downwardly and thus aid the circulation thereof. Of course, if desired, the conveyor type of agitator shown in Fig. 13 may be used in connection with the embodiment shown in Fig. 1 in place of the propeller type of agitator thereof and conversely the propeller type of agitator of Fig. 1 may be used in place of the conveyor type in the embodiment of Fig. 13.

With the dispensing device according to the present invention, it is necessary that it be cleaned, sterilized and refilled at the place of pasteurization of the milk and not at the vendor's retail establishment. Once the supply of milk is exhausted at the place of dispensing a new and filled can is started and the empty can is returned to the dairy. With the present invention and in actual practice, exacting sanitary standards in handling milk in large bulk is maintained in that the danger of subjecting the milk to injurious bacteria or dust or otherwise contaminating it is avoided.

Having thus described my invention what I claim as new and desire to secure by Letters Patent of the United States is.

I claim:—

1. In a dispensing device, the combination of, a sealed enclosure for holding liquid, agitator means, a motor operatively connected to said agitator means, swingable spout means operatively connected to said enclosure and including a valve, regulating means to admit air within said enclosure, and control means operative to open said valve automatically after said agitator means and regulating means are in operation.

2. In a dispensing device, the combination of, a sealed enclosure for holding liquid, agitator means, a motor operatively connected to said agitator means, swingable spout means operatively connected to said enclosure and including a valve, regulating means to admit air within said enclosure, and control means operative to open said valve automatically after said agitator means and regulating means are in operation, said control means comprising an inner frame slidably guided in an outer frame slidably guided in the body of said spout, spring means interconnecting said frames and adapted to be collapsed upon the displacement of said inner frame relative to said outer frame, said outer frame cooperating with means for retarding the displacement thereof in respect to the body of said spout upon the expansion of said spring means.

3. In a dispensing device, the combination of, a sealed enclosure for holding liquid, agitator means, a motor operatively connected to said agitator means, swingable spout means operatively connected to said enclosure and including a valve, regulating means to admit air within said enclosure, and control means operative to open said valve automatically after said agitator means and regulating means are in operation, said control means comprising an inner frame slidably guided in an outer frame slidably guided in the body of said spout, spring means interconnecting said frames and adapted to be collapsed upon the displacement of said inner frame relative to said outer frame, said outer frame cooperating with means retarding the displacement thereof in respect to the body of said spout upon the expansion of said spring, said outer frame having a rack and said valve carrying a pinion operated by said rack in the downwardly displacement of said outer frame to open the valve and to close said valve during the upward displacement of said control means.

4. The device according to claim 1 characterized in that the control means comprises an inner frame slidably guided in an outer frame slidably guided in the body of said spout, said frames being interconnected by a spring adapted to be collapsed upon the displacement of said inner frame relative to said outer frame, said outer frame cooperating with means retarding displacement thereof in respect to the body of said spout upon the expansion of said spring, said outer frame having a rack and said valve carrying a pinion operated by said rack in the downwardly displacement of said outer frame to open the valve and to close said valve in the upward displacement of said outer frame, said control means having a cross head including transversely disposed terminal tracks, a manipulator having a yoke including arms pivoted to the body of said spout and means carried by said arms displaceably guided in said tracks to depress or elevate said control means.

5. The device according to claim 1 further characterized in that the control means comprises an inner frame slidably guided in an outer frame slidably guided in the body of said spout, said frames being interconnected by a spring adapted to be collapsed upon the displacement of said inner frame relative to said outer frame, said outer frame cooperating with means retarding the displacement thereof in respect to the body of said spout upon the subsequent expansion on said spring, said outer frame having a rack and said valve carrying a pinion operated by said rack during downwardly displacement of said outer frame to open the valve and to close said valve during upward displacement of said outer frame, said control means having a cross head including transversely disposed terminal tracks, a manipulator having a yoke including arms pivoted to the body of said spout and means carried by said arms displaceably guided in said tracks to depress or elevate said control means, the arms having depending extensions, a guard normally encompassing the nozzle of said spout comprising split complementary sections, jaws pivotally mounted on said spout each of which carry one of said sections, said jaws each having a cam, the extensions of said arms being operable on the actuation of said manipulator to abut said cams to open said sections and render said nozzle accessible.

6. In a dispensing device, the combination of, a sealed enclosure for holding liquid, agitator means, a motor operatively connected to said agitator means, swingable spout means operatively connected to said enclosure and including a valve, regulating means to admit air within said enclosure, and control means operative to open said valve automatically after said agitator means and regulating means are in operation, said regulating means comprising a weighted floating disc having a marginal cut out portion and an opening, said disc cooperating with a hollow shaft having a channelled member juxtaposed in respect to said disc, said member embodying stop means and spring means connected to said disc and stop means.

7. In a dispensing device, the combination of, a sealed enclosure for holding liquid, agitator means, a motor operatively connected to said agitatior means, swingable spout means operatively connected to said enclosure and including a valve, regulating means to admit air within said enclosure, and control means operative to open said valve automatically after said agitator means and regulating means are in operation, said control means having an adaptor for establishing a circuit for the motor in the downward displacement of said control means and for breaking of said circuit in the upward displacement of said control means.

8. In a dispensing device, the combination of, an enclosure for holding liquid, agitator means within said enclosure, driving means operatively associated with said agitator means, spout means carried by said enclosure and including a valve, control means to initiate the operation of said driving means to rotate said agitator means prior to the opening of said valve, regulating means responsive to the acceleration of said agitator means to admit air within said enclosure and subject the head of said liquid to atmospheric pressure, said control means being operatively connected to said valve for opening the latter and means to retard the opening of said valve.

9. In a dispensing device, the combination of, an enclosure for holding liquid, agitator means within said enclosure, driving means operatively associated with said agitator means, spout means carried by said enclosure and including a valve, a siphoning instrumentality disposed within said enclosure and in communication with said spout means, valve and valve control means, manipulator means for actuating said control means to establish a closed circuit to include said driving means for rotating said agitating means, regulating means operative in response to the acceleration of said agitator means to admit air within said enclosure and subject the liquid therein to atmospheric pressure for transmitting a steady supply of said liquid through said instrumentality and means for retarding the opening of said valve until said liquid is agitated and subjected to said atmospheric pressure.

10. In a dispensing device, the combination of, an enclosure for holding liquid, agitator means, driving means operatively associated with said agitator means, spout means carried by said enclosure and including a valve, valve control means, manipulator means for actuating said control means to establish a closed circuit to include said driving means, a governor operable in response to the acceleration of said agitator means to admit air within said enclosure and subject the liquid therein to atmospheric pressure, means for retarding the opening of said valve until the liquid is agitated and subjected to said atmospheric pressure and a guard normally encompassing the terminal of said spout and having complementary swingable portions adapted to move away from said terminals upon the actuation of said manipulator means.

11. In a dispensing device, the combination of, an enclosure for holding liquid, agitator means, driving means operatively associated with said agitator means, spout means carried by said enclosure and including a valve, valve control means, manipulator means for actuating said control means to establish a closed circuit to include said driving means for rotating said agitator means, a governor operable in response to the acceleration of said agitator means to admit air within said enclosure and subject the liquid therein to atmospheric pressure, means for retarding the opening of said valve until said liquid is agitated and subjected to said atmospheric pressure, said retarding means comprising a cylinder and piston reciprocably mounted therein, the cylinder having a relatively small opening through which air is ejected on the downward displacement of said piston and a relatively large opening, a check valve disposed in said large opening to permit entrance of air within said cylinder upon the return stroke of said piston.

12. In a dispensing device, the combination of, a sealed enclosure for holding liquid, agitator means, a motor operatively connected to said agitator means, swingable spout means operatively connected to said enclosure and including a valve, regulating means operative in response to the acceleration of said agitator means, control means cooperating to open said valve automatically after said agitator means and regulating means are in operation and a manipulator for actuating said control means to initially establish an operating circuit for said motor.

13. In a dispensing device, the combination of, a sealed enclosure for holding liquid, agitator means, a motor operatively connected to said agitator means, swingable spout means connected to said enclosure and including a valve having a nozzle portion, a guard encompassing said nozzle comprising split complements swingably associated with said spout, regulating means operative in response to the acceleration of said agitator means to admit air within said enclosure and control means cooperating to open said valve automatically after the separation of said complements and during the admission of air within said enclosure.

14. In a dispensing device, the combination of, a sealed enclosure for holding liquid, agitator means, a motor operatively connected to said agitator means, swingable spout means connected to said enclosure and including a valve having a nozzle portion, a guard normally encompassing said nozzle comprising split complements swingably associated with said spout, regulating means operable in response to the acceleration of said agitator means to admit air within said enclosure, control means cooperating to open said valve after the separation of said complements and during the admission of air within said enclosure and a manipulator for actuating said control means to initially establish an operating circuit for said motor and for causing the separation of said complements.

15. In a dispensing device, the combination of, a sealed enclosure for holding liquid, agitator means, a motor operatively connected to said agitator means, swingable spout means connected to said enclosure and including a valve having a nozzle portion, a guard encompassing said nozzle comprising split complements swingably associated with said spout, regulating means operable in response to the acceleration of said agitator means, control means cooperating to open said valve after the separation of said complements and during the admission of air within said enclosure, a manipulator adapted to be depressed for actuating said control means to initially establish an operating circuit for said motor and for causing the separation of said complements and means upon the release of pressure from said manipulator for automatically closing said valve and said nozzle and for disabling of said circuit.

16. In a dispensing device, the combination of, a liquid holding enclosure having a dished and removable closure, agitator means journalled to said closure and adapted to stir said liquid, a removable motor mounted on said closure and operatively connected to said agitator means, a housing connected to said enclosure, swingable spout means operatively connected to said enclosure and adapted to be swung within said housing and outside thereof, said spout having a valve, regulating means to admit air within said enclosure, a split cup having complementary portions normally enclosing the nozzle of said spout and control means operative to open said valve in response to the acceleration of said agitator means and during the operation of said regulating means and after separation of said complementary portions.

17. In a dispensing device, the combination of, a liquid holding enclosure having a dished and removable closure sealed thereto, agitator means journalled to said closure and adapted to stir said liquid, a removable motor mounted on said closure and operatively connected to said agitator means, a housing connected to said enclosure, a spout operatively connected to said enclosure and adapted to be swung within said housing and outside thereof, said spout having a valve, a siphon arrangement disposed within said enclosure and in communication with said spout, regulating means cooperating to admit air within the enclosure in response to the acceleration of said agitator means, a split cup having complementary sections swingably connected to the body of said spout and normally adapted to enclose the nozzle thereof, control means operable to open said sections and subsequently open said valve during the effective operation of said regulating means and said agitator means, means for locking said spout when disposed within said housing or when in a position for dispensing and a cap detachably connected to said housing when said spout is disposed therein.

18. In a dispensing device, the combination of; a liquid holding enclosure having a dished and removable closure sealed thereto, agitator means journalled to said closure and adapted to stir said liquid, a slotted shell secured to said closure and surrounding said agitator means, a housing connected to said enclosure, a removable motor mounted on said closure and operatively connected to said agitator means, swingable spout means operatively connected to said enclosure and adapted to be swung within the housing and outside thereof, said spout means having a valve, a siphon arrangement disposed within said enclosure and in communication with said spout means, regulating means operable in response to the acceleration of said agitator means to admit air within the enclosure, a split cup having complementary sections swingably connected to the body of said spout means and normally adapted to enclose the nozzle thereof, control means operable to open said sections and subsequently automatically actuate and open said valve during the effective operation of said regulating means and said agitator means, means for locking said spout means when disposed within said housing or when in a position for dispensing, a cap detachably connected to said housing when said spout is disposed therein and a manipulator operatively connected to said control means and displaceable to operate the latter to open said valve and to close the latter upon a reverse displacement of said manipulator.

19. In a dispensing device, the combination of, a sealed enclosure for holding a liquid, agitator means, a motor operatively connected to said agitator means, swingable spout means operatively connected to said enclosure and including a valve, regulating means to admit air within said enclosure and control means operative to open said valve after said agitator means and regulating means are in operation, said regulating means comprising a bearing having an opening and a closure operative upon the rotation of said agitator means to conduct air into said enclosure through said opening.

HYMAN R. SEGAL.